United States Patent [19]

Ala-Huikku et al.

[11] Patent Number: 5,583,083
[45] Date of Patent: Dec. 10, 1996

[54] PROCATALYST COMPOSITION FOR HOMO- AND COPOLYMERIZATION OF ALPHA OLEFINS, ITS PREPARATION AND ITS USE

[75] Inventors: Sirpa Ala-Huikku, Helsinki; Marjaana Lommi, Kulloo, both of Finland

[73] Assignee: Neste Oy, Espoo, Finland

[21] Appl. No.: 500,813

[22] Filed: Jul. 10, 1995

Related U.S. Application Data

[63] Continuation of Ser. No. 94,172, Jul. 27, 1993, abandoned.

[30] Foreign Application Priority Data

Dec. 31, 1991 [FI] Finland ................... 0/916192

[51] Int. Cl.$^6$ ...................................... B01J 21/06
[52] U.S. Cl. ............... 502/115; 502/103; 502/104; 502/114; 502/118; 502/119; 502/128; 502/110
[58] Field of Search ..................... 502/103, 104, 502/114, 115, 118, 119, 128, 110

[56] References Cited

U.S. PATENT DOCUMENTS

| | | | |
|---|---|---|---|
| 3,787,384 | 1/1974 | Stevens et al. | 526/129 |
| 4,148,754 | 4/1979 | Strobel et al. | 502/108 |
| 4,311,612 | 1/1982 | Boone et al. | 502/119 |
| 4,363,746 | 12/1982 | Capshew | 252/429 B |
| 4,562,168 | 12/1985 | Lee | 502/128 |
| 4,618,595 | 10/1986 | Dietz | 502/119 |
| 4,618,662 | 10/1986 | Nowlin | 502/110 |
| 4,822,763 | 4/1989 | Matsuura et al. | 502/115 |
| 4,980,330 | 12/1990 | Marchand et al. | 502/115 |
| 5,034,484 | 7/1991 | Demiddeleer et al. | 502/119 |
| 5,173,465 | 12/1992 | Luciani et al. | 502/107 |
| 5,188,997 | 2/1993 | Luciani et al. | 502/107 |
| 5,192,731 | 3/1993 | Kioka et al. | 502/110 |
| 5,278,117 | 1/1994 | Luciani et al. | 502/119 |
| 5,300,470 | 4/1994 | Cuffiani et al. | 502/110 |
| 5,461,018 | 10/1995 | Ala-Huikku et al. | 502/115 |

FOREIGN PATENT DOCUMENTS

| | | |
|---|---|---|
| 0045969 | 7/1985 | European Pat. Off. . |
| 0164596 | 12/1985 | European Pat. Off. . |
| 0446989 | 9/1991 | European Pat. Off. . |
| 895703 | 11/1989 | Finland . |
| 901895 | 4/1990 | Finland . |
| 913020 | 6/1991 | Finland . |
| 914216 | 9/1991 | Finland . |
| 9108239 | 6/1991 | WIPO . |
| 9116361 | 10/1991 | WIPO . |

OTHER PUBLICATIONS

Japan Abstract No. JP 1024814, Jan. 26, 1989, "Ethylene Copolymer preparation—without supply of hydrogen in inert solvent in presence of catalyst obtained from magnesium, titanium and organoaluminum compounds" Idemitsu Petrochem KK.

Primary Examiner—Anthony McFarlane
Assistant Examiner—Walter D. Griffin
Attorney, Agent, or Firm—Steinberg, Raskin & Davidson P.C.

[57] ABSTRACT

A procatalyst composition which is suitable for the homo- and copolymerization of alpha olefins together with an organometallic cocatalyst compound and which is prepared by treating an inorganic carrier with a component system containing a complex of a magnesium halide and a tetraalkyl titanate, and a chlorinating compound which does not contain a transition metal compound. In order to raise the Mg:Ti ratio, the component system additionally contains an organomagnesium compound.

17 Claims, No Drawings

PROCATALYST COMPOSITION FOR HOMO- AND COPOLYMERIZATION OF ALPHA OLEFINS, ITS PREPARATION AND ITS USE

This is a continuation of application Ser. No. 08/094,172 filed on Jul. 27, 1993, now abandoned.

The invention relates to a procatalyst composition suitable for the homo- and copolymerization of olefins as well as to a method of preparing such a procatalyst composition and to its use together with an organometallic cocatalyst compound for the polymerization of olefins.

The Ziegler-Natta catalyst system consisting of a so-called procatalyst and a cocatalyst is commonly used for the polymerization of olefins. The procatalyst is a component which is based on a compound of a transition metal of any of the groups IVB-VIII of the Periodic Table of the Elements. The catalyst system usually also contains electron donor compounds which improve and modify the catalytic properties.

In the preparation of heterogeneous polymerization catalysts it is, as a component enhancing the polymerization activity of procatalysts, a carrier compound is used on which a transition metal compound is deposited. Usual carrier compounds are based on silica, aluminium oxide, magnesium oxide, titanium oxide, or mixtures thereof, carbon in different forms, and different types of polymers. Important carder compounds have proved to be magnesium compounds, such as, alkoxides, hydroxides, hydroxyhalides, and halides, the last-mentioned of which, magnesium dichloride in particular, have recently become the most significant carrier components of procatalyst compositions.

Since magnesium compounds and magnesium halides in particular are not activated in their basic crystal form very efficiently with transition metal compounds, their crystal structure has to be deformed. One way of providing a deformed or amorphous crystal structure of a magnesium compound is to deposit a magnesium compound, a transition metal compound, and optionally an electron donor compound on an essentially inert carrier material. Such methods are disclosed, for instance, in the following publications.

U.S. Pat. No. 4,363,746 proposes in one embodiment thereof precipitating a magnesium halide-tetraalkyl titanate complex with a dialkyl magnesium compound or with alkyl aluminium chloride and treating further with a titanium tetrahalide. It is also mentioned in the patent that the catalyst obtained can be diluted by admixing it, for instance, with silica. It is thus a question not of a carrier-material-based catalyst but of diluting the catalyst which is too active under certain polymerization conditions, with silica or an equivalent inert substance. Also, there is no mention of a carrier material in the claims.

EP patent application, Publication No. 45 969, describes the dissolving of magnesium chloride in titanium tetraethoxide in hexane and the precipitating of the mixture with ethyl aluminium sesquichloride. After decantation the precipitate is suspended in hexane, prepolymerized with ethylene and treated further with ethyl aluminium sesquichloride and titanium tetrachloride. The drawbacks of the method disclosed in the publication include an uncontrolled precipitation process as well as several treatments with a transition metal compound.

In the above-mentioned publications the activation of the procatalyst is carried out by using a titanium halide, titanium tetrachloride in particular. The removal of excess titanium tetrachloride from the catalyst requires additional washing steps and causes high costs and environmental problems in the purification of the solvents used.

FI patent application 895703 discloses a method for producing a solid procatalyst composition, in which a solid carrier is impregnated with a mixture of a Mg halide and a transition metal compound dissolving this Mg halide, and chlorinated with a compound which does not contain titanium. The use of titanium tetrachloride is avoided in accordance with the method. The Mg:Ti mole ratio used in the method is usually of the order of 0.5, and it can be no higher than about 1. The resulting polymerization activity calculated in relation to titanium is typically about 100 kg PE/g Ti h and the titanium residues in polymer about 10 ppm.

FI patent application 913020, which corresponds to Italian application 20740/90 P, discloses a method for preparing a solid catalyst component which contains titanium, magnesium, chlorine and alkoxy groups on a silica carrier. In the method a solution of magnesium chloride and an electron donor compound, or ethanol, is first prepared, and the carrier is impregnated with this solution, whereupon the carrier particles contain ethanol and magnesium chloride in a molar ratio of 5:1 to 6:1. Thereafter, partial elimination of the ethanol is carried out by heating so that the solid substance contains ethanol and magnesium chloride in a molar ratio of 1.5:1 to 4:1. The carrier material is then treated with a titanium compound, eg titanium alkoxide, and finally with alkyl aluminium chloride. In addition, the carrier material constituting the starting material can be activated in advance by heating or, alternatively, by treating it with an organometallic compound, eg a magnesium alkyl compound.

In the method of preparing a procatalyst composition disclosed in FI patent application 901895 a solid carrier is impregnated with a mixture of a Mg halide, a transition metal compound dissolving this Mg halide and an electron donor compound dissolving/suspending the Mg halide, and chlorinated with a compound that does not contain titanium. The use of the electron donor enables the Mg:Ti mole ratio to rise over one and, at the same time, a higher activity of the catalyst is achieved towards the transition metal, typically over 200 kg PE/g Ti h, and the titanium residues in polymer are then less than 5 ppm.

An object of the present invention is to provide a procatalyst composition in the preparation of which titanium tetrachloride and an electron donor are not required, thereby avoiding the drawbacks of the use thereof. Thus the procatalyst composition according to the invention, which is suitable for the homo- and copolymerization of alpha olefins together with an organometallic cocatalyst compound, and which is prepared by forming a component system which comprises on an inorganic carrier a complex compound of a magnesium halide and a tetraalkyl titanate, and a chlorinating compound containing no transition metal, is characterized in that to said component system is additionally added an organomagnesium compound in an amount such that the magnesium/titanium ratio is at least 1, preferably higher than 1, and that the preceding steps are carried out without using any polar solvent.

An advantage of the invention with respect to FI application 895703 is that a Mg:Ti mole ratio of over 1 mole/mole and typically an activity higher than 200 kg PE/g Ti h, as well as less than 5 ppm titanium residues in polymer are achieved by using an organic Mg compound in addition to a Mg halide. The use of an organic Mg compound enables a considerably quicker catalyst synthesis as compared with the method disclosed in FI patent application 901895. No evaporation and reacting of an electron donor compound is required, and consequently in the preparation of the catalyst one drying step is sufficient as the last stage of the synthesis.

Although the same starting materials of the catalyst components can be optionally used in the above-mentioned Finnish patent application FI 913020, the composition in question is nevertheless different because the same starting materials have been added in different order and, moreover, such starting materials have been used which are not at all used in the catalyst according to the present invention. The way of addition and the order of addition of the starting materials are of very great importance to the properties and the composition of a catalyst because the starting material component added at each stage reacts chemically with the chemical compounds formed by the components added at the preceding stages, not with single components. A complex of magnesium chloride and titanium alkoxide formed in advance has thus not been used in FI patent application 913020. The optionally proposed use of the magnesium alkyl for activating the carrier material leads to the fact that the magnesium alkyl reacts with the surface hydroxyls of silica. In accordance with the invention, an organomagnesium compound is added to the finished component system at the final stage of the catalyst system. In FI patent application 913020 magnesium chloride is always found in a complex with ethanol, which is a polar solvent. The adding of titanium alkoxide to this kind of complex leads to a result different from that of the present invention. In general, the drawbacks of the method disclosed in FI application 913020 may be considered to be the amount of magnesium which is many times that of titanium, the high amount of chlorine which gets further into the product, the relatively low activity calculated towards titanium, and the complicated and difficult preparation: high temperatures, increases and decreases of temperatures, several separate drying steps and washing steps which prolong the carrying out of the catalyst synthesis.

The carrier material used in the invention can be any porous inorganic or organic substance. Of the organic carrier materials, polymers may be mentioned. Inorganic materials that are particularly advantageous include the carrier materials based on oxides of silicon, aluminium, titanium and/or magnesium. These substances include eg silica, aluminium oxide, magnesium oxide, magnesium silicate, titanium oxide, etc. Particularly preferred are silica, aluminium oxide and magnesium silicate or a mixture thereof. Silica is the most preferred. A suitable particle size of the carrier material is 10 to 200 m and preferably 20 to 150 m. The carrier material is preferably chosen such that the particle size distribution thereof is as narrow as possible.

The physically bound water and/or the surface hydroxyl groups can be removed, if desired, from the carrier material thermally and/or chemically.

The thermal treatment comprises the removal of water at temperatures below 200° C. and the calcination of the surface hydroxyls at higher temperatures. The thermal treatment is advantageously carried out at a temperature of about 100° to 1000° C.

The substances suitable for the chemical treatment of the carrier material include organic silicon, aluminium, zinc, phosphorus and/or fluorine compounds. Of the suitable organic silicon compounds which are advantageous, compounds of the formula $(R_3Si)_2NH$ or the formula $R_nSiX_{4-n}$ may be mentioned, wherein R is hydrogen and/or an alkyl group, X is halogen and n is 1,2 or 3. Of the advantageous organic aluminium compounds, compounds of the formula $[R_nAlX_{3-n}]_m$ may be mentioned, wherein R is hydrogen and/or a hydrocarbon group containing 1 to 20 carbon atoms, preferably a lower alkyl group, X is halogen, n is 1,2 or 3, and m is 1 or 2. Advantageous phosphorus compounds include phosphorus trihalides, phosphorus oxytrihalides, dialkyl phosphorus halides, monoalkyl phosphorus halides, and diaminophosphorus oxyhalides. Suitable fluorine compounds include gaseous fluorine, hydrogen fluoride, boron trifluoride, silicon tetrafluoride and sulphur oxydifluoride.

The magnesium halide-tetraalkyl titanate complex is prepared by dissolving a Mg halide, preferably magnesium dichloride, in titanium alkoxide dissolving it at a temperature above 20° C. Titanium alkoxide is used at least in an amount such that the magnesium chloride dissolves completely, which means at least two moles of titanium alkoxide for one mole of the magnesium halide. A hydrocarbon solvent can also be added to the solution, eg pentane or hexane, to improve the viscosity, or fluidity, of the solution.

The components of the Mg halide-titanium alkoxide complex can also be added to the carrier material without a separate dissolution so that the Mg halide, a hydrocarbon solvent, if any, and the tetraalkyl titanate are admixed with the carrier material, in any order, after which the mixture can be mixed at a temperature above 20° C. for a few hours.

The chlorinating reagent containing no transition metal is advantageously HCl, $CCl_4$ or particularly a compound of the formula $[R_nAlCl_{3-n}]_m$ wherein R is a hydrocarbon group containing 1 to 20 carbon atoms, preferably a lower alkyl group, n is 1 or 2, and m is 1 or 2. Typical aluminium compounds suitable for the chlorination are alkyl aluminium chlorides, such as, diethyl aluminium chloride, ethyl aluminium dichloride and ethyl aluminium sesquichloride.

In accordance with the invention, the chlorinating reagent can be added to the carrier material either before or after the addition of the Mg/Ti complex. The first-mentioned way is recommended. The chlorinating reagent is preferably added in a hydrocarbon solution, for example, as a solution in pentane. Other hydrocarbon solvents conventionally used for this purpose are also usable. Chlorination can be carried out simply by admixing the chlorinating reagent or its hydrocarbon solution with the carrier material and by mixing preferably at elevated temperature for a maximum period of a few hours. The mixing time and the mixing temperature are not critical, and they can be varied within a fairly broad range. The suitable mixing time may thus be from 10 minutes to 4 hours and the mixing temperature within the range of 15° to 50° C.

The organic magnesium compound is any compound of the formula RMgR' or a mixture of compounds of said formula or a complex of a compound of said formula formed with an organic aluminium, boron, beryllium or zinc compound. In the formula R is a hydrocarbon group containing 1 to 20 carbons and R' is a hydrocarbon group containing 1 to 20 carbons or halogen. Suitable organic magnesium compounds are, for instance, n-butyl ethyl magnesium, butyl octyl magnesium, butyl octyl magnesium ethoxide, ethyl magnesium chloride, etc.

In view of the invention it is essential that the organic magnesium compound is always added after the chlorinating compound. It has been observed that, when the organomagnesium compound is added to the carrier material before other components, the effect is clearly seen as a very low MFR value in the polymerized product, as demonstrated by the comparative examples presented later. The organomagnesium compound can thus be added either as the last component or after the chlorinating compound and before the addition of the magnesium halide-titanium alkoxide complex. It is, however, preferably added as the last component. The organomagnesium compound is conveniently added after being dissolved in a suitable hydrocarbon solvent, eg dissolved in pentane or heptane, after which the product obtained is mixed preferably at elevated temperature for some time, for instance, from 10 minutes to 4 hours at 20° to 50° C.

The amount of the organomagnesium compound to be added is selected such that the magnesium:titanium ratio in the final procatalyst component rises at least to the value 1, but preferably said ratio is higher than 1.

The preparation of the procatalyst composition according to the invention is easy and quick and thus economical. The catalyst composition also acts well when a carrier material is used which has not been treated at all, in which case the whole preparation process comprises only one drying step as the last stage of the synthesis. It shall also be noted that washing steps are not required at all at any stage of the preparation. No waste whatever is produced, and the hydrocarbon solvent/solvents can be recycled for reuse.

The catalyst of the invention is particularly suitable for the polymerization of ethylene with good activity and with good hydrogen and comonomer sensitivity. In addition to the above-mentioned advantages, the polymer obtained has a narrow molecular weight distribution (as a measurement of the molecular weight distribution is commonly used the ratio FRR (flow rate ratio) of melt flow rate values (MFR, melt flow rate), when said values are measured using 21.6 and 2.16 kg weights), good morphology for different uses and low chlorine and titanium residues.

The following examples illustrate the invention.

CATALYST PREPARATION

Preparation of $MgCl_2*2Ti(OC_4H_9)_4$ Complex 3.0 g of anhydrous magnesium dichloride and 21.8 ml of titanium tetrabutoxide were mixed in a 90°–110° C. bath for 20 h in order to dissolve the material completely. The amount of the complex solution obtained was 24.75 g and the density thereof was 1.058 g/ml.

EXAMPLE 1

6.0 ml of n-pentane and 10.7 ml of a 10 wt % solution of ethyl aluminium dichloride (EADC) in pentane were added to 2.222 g of silica dried at 100° C. and mixed for one hour at 45° C. To the mixture were added 0.77 ml of the $MgCl_2*2Ti(OBu)_4$ complex solution and mixed at 45° C. for 3 hours. Thereafter, 3.8 ml of a 20 wt % solution of butyl octyl magnesium (BOMAG-A) in heptane were added to the mixture, mixed for one hour at 45° C. and dried under a gaseous nitrogen stream for 30 minutes at the same temperature.

The composition of the catalyst was: Ti 2.2%, Mg 2.3%, Cl 13.2%, Al 3.9%.

EXAMPLE 2

The procedure of Example 1 was repeated with the exception that 1.3 ml of a 20 wt % solution of BOMAG-A in heptane were used.

The composition of the catalyst was: Ti 2.7%, Mg 1.2%, Cl 13.3%, Al 5.1%.

EXAMPLE 3

The procedure of Example 2 was repeated with the exception that 8.6 ml of a 10 wt % solution of EADC in pentane were used.

The composition of the catalyst was: Ti 2.4%, Mg 1.1%, Cl 10.6%, Al 3.5%.

EXAMPLE 4

The procedure of Example 2 was repeated with the exception that undried silica was used.

The composition of the catalyst was: Ti 2.0%, Mg 1.1%, Cl 11.7%, Al 3.9%.

EXAMPLE 5

The procedure of Example 1 was repeated with the exception that silica calcined at 300° C. was used.

The composition of the catalyst was: Ti 2.0%, Mg 2.3%, Cl 11.3%, Al 3.5%.

EXAMPLE 6

The procedure of Example 1 was repeated with the exception that silica calcined at 600° C. was used.

The composition of the catalyst was: Ti 2.3%, Mg 2.4%, Cl 12.0%, Al 3.6%.

EXAMPLE 7

6.0 ml of n-pentane and 10.7 ml of a 10 wt % solution of EADC in pentane were added to 2.222 g of silica dried at 100° C. and mixed at 45° C. for one hour. 5.08 ml of a 20 wt % solution of BOMAG-A in heptane were added to the mixture and mixed for one hour at 45° C. Thereafter, 0.77 ml of the $MgCl_2*2Ti(OBu)_4$ complex solution were added to the mixture, mixed at 45° C. for 3 hours and dried at the same temperature under a gaseous nitrogen stream for 30 minutes.

The composition of the catalyst was: Ti 1.9%, Mg 2.2%, Cl 11.3%, Al 3.9%.

EXAMPLE 8

10.0 ml of n-pentane and 0.77 ml of the $MgCl_2*2Ti(OBu)_4$ complex solution were added to 2.222 g of silica calcined at 600° C. and mixed at 45° C. for one hour. 8.6 ml of a 10 wt % solution of EADC in pentane were added to the mixture and mixed at 45° C. for 3 hours. After that, 1.27 ml of a 20 wt % solution of BOMAG-A in heptane were added to the mixture and mixed at 45° C. for one hour and dried at the same temperature under a gaseous nitrogen stream for 30 minutes.

The composition of the catalyst was: Ti 2.1%, Mg 0.97%, Cl 9.4%, Al 3.4%.

EXAMPLE 9

10.0 g of silica calcined at 600° C. were suspended in 65 ml of n-pentane. 0.48 ml of triethylaluminium (TEA) were added to the suspension, mixed for 30 minutes at room temperature and dried in a 50° C. bath under a gaseous nitrogen stream for 90 minutes.

6.0 ml of n-pentane and 0.39 ml of the $MgCl_2*2Ti(OBu)_4$ complex solution were added to 1.11 g of the silica treated with TEA and mixed at 45° C. for one hour. 4.3 ml of a 10 wt % solution of EADC in pentane were added to the mixture and mixed at 45° C. for 3 hours. Thereafter, 0.64 ml of a 20 wt % solution of BOMAG-A in heptane were added to the mixture and mixed for one hour at 45° C. and dried at the same temperature under a gaseous nitrogen stream for 30 minutes.

The composition of the catalyst was: Ti 2.6%, Mg 1.4%, Cl 12.2%, Al 3.8%.

EXAMPLE 10

11 g of silica were suspended in 85 ml of n-heptane. The temperature of the bath was raised to 110° C. and about half of the heptane was boiled away. 1.75 g of hexamethyldisilazane (HMDS) were added to the mixture, mixed in a 110° C. bath for 2 hours, after which the mixture was filtered and dried under a gaseous nitrogen stream in a 110° C. bath.

In the preparation of the catalyst the procedure of Example 9 was repeated, except that 1.11 g of silica treated with hexamethyldisilazane (HMDS) were used.

The composition of the catalyst was: Ti 2.9%, Mg 1.4%, Cl 12.2%, Al 2.8%.

EXAMPLE 11

To 1.11 g of silica calcined at 600° C. were added 53 mg of $MgCl_2$, 0.38 ml of $Ti(OBu)_4$ and 4.0 ml of n-heptane. The mixture was mixed in a 110°–120° C. bath for 4 hours and allowed to stand at room temperature for 16 hours. 4.3 ml of a 10 wt % solution of EADC in pentane were added to the mixture, mixed in a 45° C. bath for 3 hours. Finally, 0.64 ml of a 20 wt % solution of BOMAG in heptane were added to the mixture, mixed in a 45° C. bath for 1 hour and dried at the same temperature under a gaseous nitrogen stream for 30 minutes.

The composition of the catalyst was: Ti 2.0%, Mg 0.78%, Cl 10.2%, Al 3.1%.

EXAMPLE 12

(Comparison) 6.0 ml of n-pentane and 6.35 ml of a 20 wt % solution of BOMAG-A in heptane were added to 2.222 g of silica dried at 100° C. and mixed at 45° C. for one hour. 10.7 ml of a 10 wt % solution of EADC in pentane were added to the mixture and mixed at 45° C. for one hour. After that, 0.77 ml of the $MgCl_2*2Ti(OBu)_4$ complex solution were added to the mixture, mixed at 45° C. for 3 hours and dried for 60 minutes at the same temperature.

The composition of the catalyst was: Ti 2.0%, Mg 3.2%, Cl 11.3%, Al 3.6%.

EXAMPLE 13

(Comparison)

6.0 g of micropearl silica (Crosfield ES70X) dried at 200° C. were placed in a 120 ml flask under inert conditions. The silica was suspended in 60 ml of n-pentane having a moisture content of 1.6 ppm. To the mixture were added 6.9 ml of butyl octyl magnesium as a 20 wt % solution in heptane (6.039 mmol). The mixture was mixed at 60° C. for 30 minutes and dried by evaporating the solvent.

Into a 120 ml flask were introduced 0.6 g (6.302 mmol) of anhydrous magnesium dichloride and 13.33 ml (228.38 mmol) of absolute ethanol having a moisture content of 184 ppm. The mixture was mixed at 60° C. for 30 minutes to dissolve the magnesium chloride completely. 2.0 g of the silica activated with butyl octyl magnesium were suspended in the solution. The suspension was mixed at 60° C. for 30 minutes, after which 0.43 ml (1.252 mmol) of titanium tetrabutylate were added, mixed at 60° C. for 1 hour and then dried at the same temperature for 60 minutes and at 120° C. for a further 60 minutes. The thus obtained solid substance was cooled to room temperature and then suspended in 7.0 ml of n-pentane. To the suspension were added 8.3 ml (2.187 mmol) of a 10 wt % solution of ethyl aluminium sesquichloride in pentane and the mixture was mixed at 25° C. for one hour. The solid substance was then separated by filtration, washed with water-free n-pentane until no more chlorides were found in the washing liquid, and finally dried by evaporating the solvent. The Mg:Ti:Cl ratios of the resulting solid catalyst were 6:1:13.

The composition of the catalyst was: Ti 2.5%, Mg 7.6%, Cl 24.0%, Al 1.7%.

EXAMPLE 14

(Comparison)

Into a 120 ml flask were introduced 0.6 g (6.302 mmol) of anhydrous magnesium dichloride and 15.0 ml (256.99 mmol) of absolute ethanol having a moisture content of 184 ppm. The mixture was mixed at 60° C. for 30 minutes to dissolve the magnesium chloride completely. In the solution were suspended 2.0 g of the silica activated with butyl octyl magnesium according to Example 13. The suspension was mixed at 60° C. for 30 minutes and then dried at the same temperature for 60 minutes and at 120° C. for a further 60 minutes, after which the thus obtained solid material was cooled to room temperature and suspended in 15 ml of n-pentane. To the suspension were added 0.74 ml (2.17 mmol) of titanium tetrabutylate, mixed at 60° C. for one hour and dried by evaporating the solvent. The thus obtained solid substance was cooled to room temperature and then suspended in 13.0 ml of n-pentane. To the suspension were added 16.58 ml (4.38 mmol) of ethyl aluminium sesquichloride as a 10 wt % solution in pentane and the mixture was mixed at 25° C. for 15 minutes. The solid substance was then separated by filtration and washed with n-pentane until no more chlorides were found in the washing liquid. The washing required 3 times 15 ml of pentane. After that, the thus obtained substance was dried by evaporating the solvent. The Mg:Ti:Cl ratios of the resulting solid catalyst were 4.6:1:10.2.

The composition of the catalyst was: Ti 3.2%, Mg 7.4%, Cl 24.2%, Al 1.1%.

EXAMPLE 15

(Comparison)

23.8 g of anhydrous magnesium dichloride and 174.6 ml of titanium tetrabutoxide were mixed in a 80° C. bath for 16 hours to dissolve the material completely. The mixture was cooled to about 50° C., whereafter to the mixture were added by mixing 105 ml of n-pentane. 263 g of the complex solution were obtained and the density thereof was 0.919 g/ml.

To 2.0 g of silica (Crosfield ES70X) dried at 100° C. were added 8.0 ml of n-pentane and 4.58 ml of EADC as a 20 wt % solution in pentane and mixed at 45° C. for one hour. To the mixture were added 1.1 ml of the $MgCl_2*2Ti(OBu)_4$ complex as a 75 wt % solution and mixed at 45° C. for 3 hours. Finally, the catalyst was dried at 45° C. under a gaseous nitrogen stream for 30 minutes. The Mg:Ti:Cl ratios of the resulting solid catalyst were 0.5:1:5.4.

Test Polymerization

The test polymerization of ethylene was carried out in each Example in the following way: a 3 l autoclave was charged with 1.8 l of isobutane which had been purified with oxygen and moisture scavengers. The procatalyst (40–50 mg) and the cocatalyst (TEA, Al/Ti=30–40) were fed to the reactor. The temperature was raised to 95° C. A pressure reactor of 0.5 l capacity was pressurized to 5.5 bars with hydrogen, which was fed into the reactor together with ethylene until the total pressure was 28.5 bars. The polymerization was continued for one hour and the total pressure was maintained constant by means of the ethylene feed.

The polymerization results are set out in the Table hereinafter.

As demonstrated by the comparative Example 12, the order of addition of the organometallic compound is of considerable practical significance to the MFR value of the polymerization product. In particular, when BOMAG is the first to be added direct to silica, the MFR value of the product drops dramatically.

The comparative Examples 13 and 14 (mainly corresponding to Finnish patent applications FI 914216 and FI 913020), in which BOMAG has also been added to silica at the first stage of the synthesis and, in addition, a polar solvent, ie ethanol, has been used for dissolving the magnesium chloride, clearly demonstrate that the activity of the catalysts calculated in relation to titanium is substantially poorer than in the catalysts according to the invention. Likewise, the chlorine amount of the catalysts and consequently the amount of chlorine getting into the product as well and, at the same time, the titanium residue are substantially higher than those in the catalysts of the invention. Furthermore, the catalyst synthesis employed is very complicated and slow as compared with the very simple synthesis according to the invention.

The comparative Example 15, in which no organomagnesium compound has been used, clearly demonstrates the significance of the compound in the procatalyst composition of the invention.

TABLE

Polymerization Results

| Example | Calcination temperature of silica °C. | Mg/Ti mole ratio | EADC/Ti mole ratio | Activity kg/g Ti h | MFR (21.6) g/10 min | FRR (21./2) | Bulk density kg/m$^3$ |
|---------|------|------|--------|-----|------|------|-----|
| 1  | 100   | 2.0 | 2.5    | 274 | 25.1 | 27.8 | 310 |
| 2  | 100   | 1.0 | 2.5    | 217 | 18.2 | 27.6 | 350 |
| 3  | 100   | 1.0 | 2.0    | 220 | 17.7 | 28.5 | 370 |
| 4  | —     | 1.0 | 2.5    | 232 | 17.1 | 29.2 | 310 |
| 5  | 300   | 2.0 | 2.5    | 176 | 24.2 | 29.7 | 340 |
| 6  | 600   | 2.0 | 2.5    | 192 | 21.9 | 28.1 | 310 |
| 7  | 100   | 2.5 | 2.5    | 261 | 12.2 | 30.2 | 340 |
| 8  | 600   | 1.0 | 2.0    | 205 | 15.9 | 31.0 | 310 |
| 9  | 600*) | 1.0 | 2.0    | 186 | 14.1 | 30.0 | 340 |
| 10 | **)   | 1.0 | 2.0    | 254 | 14.2 | 29.8 | 320 |
| 11 | 600   | 1.0 | 2.0    | 179 | 13.7 | 28.0 | 290 |
| 12 | 100   | 3.0 | 2.5    | 229 | 5.9  | 30.0 | 360 |
| 13 | 200   | 6.0 | 1.7 x) | 130 | 40.3 | 29.3 | 370 |
| 14 | 200   | 4.6 | 2.0 x) | 98  | 27.0 | 31.4 | 330 |
| 15 | 100   | 0.5 | 2.5    | 53  | 25.5 | 25.9 | 350 |

The order of addition of the chemicals to silica:
Examples 1–6: EADC/MgCl$_2$*2Ti(OBu)$_4$/BOMAG
Example 7: EADC/BOMAG/MgCl$_2$*2Ti(OBu)$_4$
Examples 8–11: MgCl$_2$*2Ti(OBu)$_4$/EADC/BOMAG
Example 12: BOMAG/EADC/MgCl$_2$*2Ti(OBu)$_4$
Example 15: EADC/MgCl$_2$*2Ti(OBu)$_4$
MFR: melt flow rate, ISO 1133, condition 7
FRR: flow rate ratio
BD: bulk density
*) treated with TEA
**) treated with hexamethyldisilazane
x) EASC/Ti (EASC = Et$_2$Al$_2$Cl$_3$)

We claim:

1. A procatalyst composition which is suitable for the homo- and copolymerization of alpha olefins together with an organometallic cocatalyst compound, said composition prepared in the absence of any chlorine containing transition metal compound by forming on an inorganic carrier a component system of a complex of a magnesium halide, a tetraalkyl titanate, and a chlorinating compound containing no transition metal, said composition further containing an additional amount of magnesium added as an organomagnesium compound such that the magnesium/titanium molar ratio is raised over 1, said organomagnesium compound being added after said chlorinating compound.

2. A composition according to claim 1, characterized in that the organomagnesium compound is one or more compounds of the formula RMgR', wherein R is a hydrocarbon group containing 1 to 20 carbons and R' is a hydrocarbon group containing 1 to 20 carbons or halogen, or a complex thereof with an aluminium, boron, beryllium or zinc compound.

3. A composition according to claim 2, characterized in that the organomagnesium compound has been selected from the group consisting of n-butyl ethyl magnesium, butyl octyl magnesium, butyl octyl magnesium ethoxide and ethyl magnesium chloride.

4. A composition according to claim 1, characterized in that in said component system the organomagnesium compound has been added as the last stage or at least after the chlorinating compound.

5. A composition according to claim 1, characterized in that the tetraalkyl titanate is ethyl titanate, Ti(OEt)$_4$, propyl titanate, (Ti(OPr)$_4$, or most preferably butyl titanate, Ti(OBu)$_4$.

6. A composition according to claim 1, characterized in that the magnesium halide is magnesium chloride.

7. A composition according to claim 1, characterized in that the chlorinating compound containing no transition metal is HCl, CCl$_4$, BCl$_3$, SiCl$_4$ or a compound of the formula [R$_n$AlCl$_{3-n}$]$_m$ wherein R is a hydrocarbon group containing 1 to 20 carbon atoms, preferably a lower alkyl group, n is 1 or 2 and m is 1 or 2.

8. A composition according to claim 7, characterized in that the chlorinating compound containing no transition metal is diethyl aluminium chloride, ethyl aluminium dichloride or ethyl aluminium sesquichloride.

9. A method for preparing a procatalyst composition which is suitable for the homo- and copolymerization of alpha olefins together with an organometallic cocatalyst compound, comprising adding in the absence of any chlorine containing transition metal compound onto an inorganic carrier a component system of a complex of a magnesium halide, a tetraalkyl titanate, and a chlorinating compound containing no transition metal, and said method further comprising adding an additional amount of magnesium as an organomagnesium compound after said chlorinating compound such that the magnesium/titanium molar ratio is raised over 1.

10. A method according to claim 9, characterized in that the organomagnesium compound is one or more compounds of the formula RMgR', wherein R is a hydrocarbon group containing 1 to 20 carbons and R' is a hydrocarbon group containing 1 to 20 carbons or halogen, or a complex thereof with an aluminium, boron, beryllium or zinc compound.

11. A method according to claim 10, characterized in that the organomagnesium compound has been selected from the group consisting of n-butyl ethyl magnesium, butyl octyl magnesium, butyl octyl magnesium ethoxide and ethyl magnesium chloride.

12. A method according to claim 9, characterized in that in said component system the organomagnesium compound is added as the last stage or at least after the chlorinating compound.

13. A method according to claim 9, characterized in that the tetraalkyl titanate is ethyl titanate, $Ti(OEt)_4$, propyl titanate, $(Ti(OPr)_4$, or most preferably butyl titanate, $Ti(OBu)_4$.

14. A method according to claim 9, characterized in that the magnesium halide is magnesium chloride.

15. A method according to claim 9, characterized in that the chlorinating compound containing no transition metal is HCl, $CCl_4$, $BCl_3$, $SiCl_4$ or a compound of the formula $[R_nAlCl_{3-n}]_m$ wherein R is a hydrocarbon group containing 1 to 20 carbon atoms, preferably a lower alkyl group, n is 1 or 2 and m is 1 or 2.

16. A method according to claim 15, characterized in that the chlorinating compound containing no transition metal is diethyl aluminium chloride, ethyl aluminium dichloride or ethyl aluminium sesquichloride.

17. In a method for preparing a procatalyst composition for homo- or copolymerizing alpha-olefins comprising adding onto an inorganic carrier a chlorinating compound containing no transitional metal and a solution of a magnesium halide in a tretraalkyl titanate, the improvement which comprises adding, without a washing or drying step, an additional amount of an organomagnesium compound in order to achieve a procatalyst composition after drying in which the magnesium/titanium molar ratio is raised over 1.

* * * * *